United States Patent
Scott et al.

(10) Patent No.: US 8,719,300 B2
(45) Date of Patent: May 6, 2014

(54) CATALOG PERFORMANCE PLUS

(75) Inventors: Michael R. Scott, Ocean View, HI (US);
Max D. Smith, Tucson, AZ (US); David C. Reed, Tucson, AZ (US); Philip R. Chauvet, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 594 days.

(21) Appl. No.: 12/251,507

(22) Filed: Oct. 15, 2008

(65) Prior Publication Data

US 2010/0094832 A1   Apr. 15, 2010

(51) Int. Cl.
*G06F 17/30* (2006.01)

(52) U.S. Cl.
USPC ............................................. 707/781; 707/812

(58) Field of Classification Search
CPC .......................... G06Q 30/0641; G06F 19/324
USPC .................... 707/781, 812; 709/200; 710/104
See application file for complete search history.

(56) References Cited

U.S. PATENT DOCUMENTS

| | | | |
|---|---|---|---|
| 5,377,351 A * | 12/1994 | Kotera et al. | 1/1 |
| 6,557,035 B1 | 4/2003 | McKnight | |
| 2003/0204781 A1 | 10/2003 | Peebles et al. | |
| 2004/0139142 A1* | 7/2004 | Arwe | 709/200 |
| 2005/0076043 A1* | 4/2005 | Benedetti et al. | 707/100 |
| 2007/0088769 A1* | 4/2007 | Pace et al. | 707/204 |
| 2007/0250377 A1 | 10/2007 | Hill, Jr. et al. | |

* cited by examiner

*Primary Examiner* — Shahid Alam
(74) *Attorney, Agent, or Firm* — Terrile, Cannatti, Chambers & Holland, LLP; Stephen A. Terrile

(57) ABSTRACT

A method, system and computer-usable medium are disclosed for managing an integrated catalog facility (ICF) catalog. An ICF catalog is monitored by a contention detection module. Information related to a detected catalog resource contention is used by the contention detection module to generate a contention event. Information related to the contention event is then provided to a contention resolution module, which uses the information to perform a contention resolution operation. Once the resolution operation has been performed, contention events and contention resolution operations are reported by a contention reporting module.

18 Claims, 3 Drawing Sheets

CATALOG PERFORMANCE PLUS

BACKGROUND OF THE INVENTION

1. Field of the Invention

Embodiments of the disclosure relate in general to the field of computers and similar technologies, and in particular to software utilized in this field. Still more particularly, it relates to managing an integrated catalog facility (ICF) catalog.

2. Description of the Related Art

The processing power and storage capacity of today's information processing systems continues to grow. At the same, the volume and complexity of the information processed by these systems has increased proportionately. One known approach to managing this information is to organize it into catalogs. In essence, a catalog is a data set that contains information about the organization and location of other data sets. A data set is a collection of logically related data stored on one or more storage volumes. As an example, a data set may be a source program, a library of macros, or a file of data records used by an information processing program. A catalog does not have to be on the same volumes as the data set it describes and can likewise refer to hundreds or thousands of data sets spread across many volumes.

Catalogs are sometimes structured in an integrated catalog facility (ICF), which stores catalog records in two components. The first of these components is the basic catalog structure (BCS) and the second is the virtual sequential access method (VSAM) volume data set (VVDS). The primary function of the BCS is to point to the volumes on which a data set is stored. A BCS does not have to be on the same volume as the data set it references and there can be more than one BCS on a volume. The VVDS contains the information needed to process VSAM data sets and there is one VVDS on each volume containing data sets cataloged by the ICF. Another advantage to catalogs is that they allow users to find and access a data set by name without knowing the exact location of the data set in memory storage or how the storage is structured.

Maintaining ICF catalog performance can become more challenging as the number of catalogs and their associated data sets grow. In particular, catalog throughput may be affected due to contention over Catalog Address Space (CAS) resources. However, current catalog performance tools are static in nature and only provide after-the-fact analysis. Furthermore, none of these provide a dynamic display of catalog throughput nor do they provide the ability to make changes dynamically as the catalog workload is being processed. In view of the foregoing, there is a need for a real time monitor to allow resolution of ICF catalog performance issues.

BRIEF SUMMARY OF THE INVENTION

The present invention includes, but is not limited to, a method, system and computer-usable medium for managing an integrated catalog facility (ICF) catalog. In various embodiments, the operation of an ICF catalog is monitored by a contention detection module to detect catalog resource contentions. If a catalog resource contention is detected, then the contention detection module uses information related to the catalog resource contention to generate a contention event. In one embodiment, the catalog resource contention information is received from a Resource Measurement Facility (RMF). In another embodiment, the catalog activity and type of usage information is received from a System Management Facility (SMF). In yet another embodiment, the catalog resource contention information is received from a Catalog Address Space (CAS).

To resolve the catalog resource contention, a contention resolution module first receives information related to the contention event from the contention detection module. The information related to the contention event is then used by the contention resolution module to perform a contention resolution operation. Once the resolution operation has been performed, contention events and contention resolution operations are reported by a contention reporting module. The above, as well as additional purposes, features, and advantages of the present invention will become apparent in the following detailed written description.

BRIEF DESCRIPTION OF THE DRAWINGS

Selected embodiments of the present invention may be understood, and its numerous objects, features and advantages obtained, when the following detailed description is considered in conjunction with the following drawings, in which.

DETAILED DESCRIPTION

Figure 1:
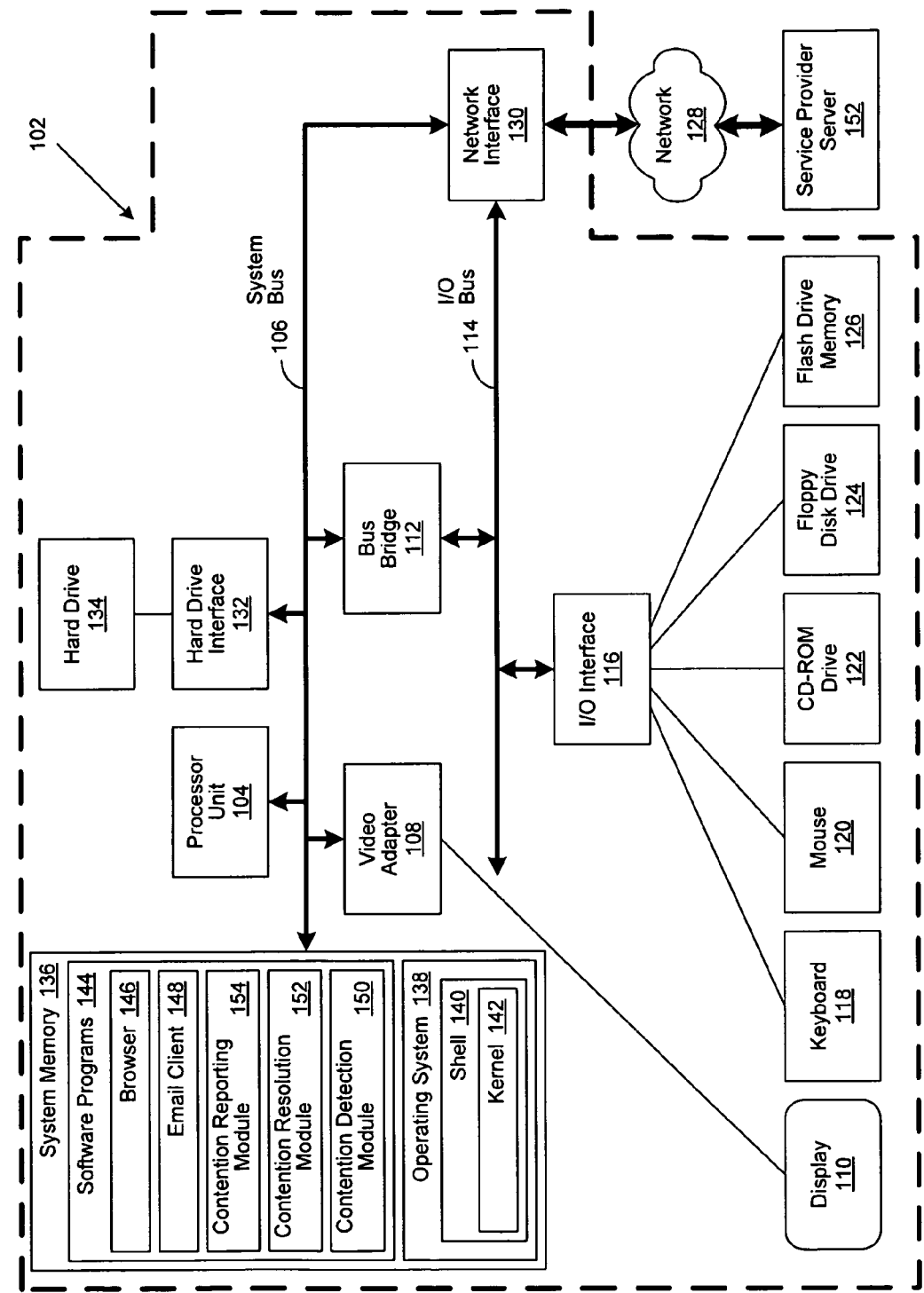
FIG. 1 depicts an exemplary client computer in which the present invention may be implemented.

A method, system and computer-usable medium for managing an integrated catalog facility (ICF) catalog. As will be appreciated by one skilled in the art, the present invention may be embodied as a method, system, or computer program product. Accordingly, embodiments of the invention may be implemented entirely in hardware, entirely in software (including firmware, resident software, micro-code, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therein, either in baseband or as part of a carrier wave. The computer usable program code may be transmitted using any appropriate medium, including but not limited to the Internet, wireline, optical fiber cable, radio frequency (RF), etc.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is a block diagram of an exemplary client computer 102 in which the present invention may be utilized. Client computer 102 includes a processor unit 104 that is coupled to a system bus 106. A video adapter 108, which controls a display 110, is also coupled to system bus 106. System bus 106 is coupled via a bus bridge 112 to an Input/Output (I/O) bus 114. An I/O interface 116 is coupled to I/O bus 114. The I/O interface 116 affords communication with various I/O devices, including a keyboard 118, a mouse 120, a Compact Disk-Read Only Memory (CD-ROM) drive 122, a floppy disk drive 124, and a flash drive memory 126. The format of the ports connected to I/O interface 116 may be any known to those skilled in the art of computer architecture, including but not limited to Universal Serial Bus (USB) ports.

Client computer 102 is able to communicate with a service provider server 152 via a network 128 using a network interface 130, which is coupled to system bus 106. Network 128 may be an external network such as the Internet, or an internal network such as an Ethernet Network or a Virtual Private Network (VPN). Using network 128, client computer 102 is able to use the present invention to access service provider server 152.

A hard drive interface 132 is also coupled to system bus 106. Hard drive interface 132 interfaces with a hard drive 134. In a preferred embodiment, hard drive 134 populates a system memory 136, which is also coupled to system bus 106. Data that populates system memory 136 includes the client computer's 102 operating system (OS) 138 and software programs 144.

OS 138 includes a shell 140 for providing transparent user access to resources such as software programs 144. Generally, shell 140 is a program that provides an interpreter and an interface between the user and the operating system. More specifically, shell 140 executes commands that are entered into a command line user interface or from a file. Thus, shell 140 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. While shell 140 generally is a text-based, line-oriented user interface, the present invention can also support other user interface modes, such as graphical, voice, gestural, etc.

As depicted, OS 138 also includes kernel 142, which includes lower levels of functionality for OS 138, including essential services required by other parts of OS 138 and software programs 144, including memory management, process and task management, disk management, and mouse and keyboard management.

Software programs 144 may include a browser 146 and email client 148. Browser 146 includes program modules and instructions enabling a World Wide Web (WWW) client (i.e., client computer 102) to send and receive network messages to the Internet using HyperText Transfer Protocol (HTTP) messaging, thus enabling communication with service provider server 152. Software programs 144 also include a contention detection module 150, a contention resolution module 152, and a contention reporting module 154. The contention detection module 150, contention resolution module 152, and contention reporting module 154 include code for implementing the processes described in FIGS. 2 through 3 described hereinbelow. In one embodiment, client computer 102 is able to download the contention detection module 150, contention resolution module 152, and contention reporting module 154 from a service provider server 152.

The hardware elements depicted in client computer 102 are not intended to be exhaustive, but rather are representative to highlight components used by the present invention. For instance, client computer 102 may include alternate memory storage devices such as magnetic cassettes, Digital Versatile Disks (DVDs), Bernoulli cartridges, and the like. These and other variations are intended to be within the spirit and scope of the present invention.

Figure 2:
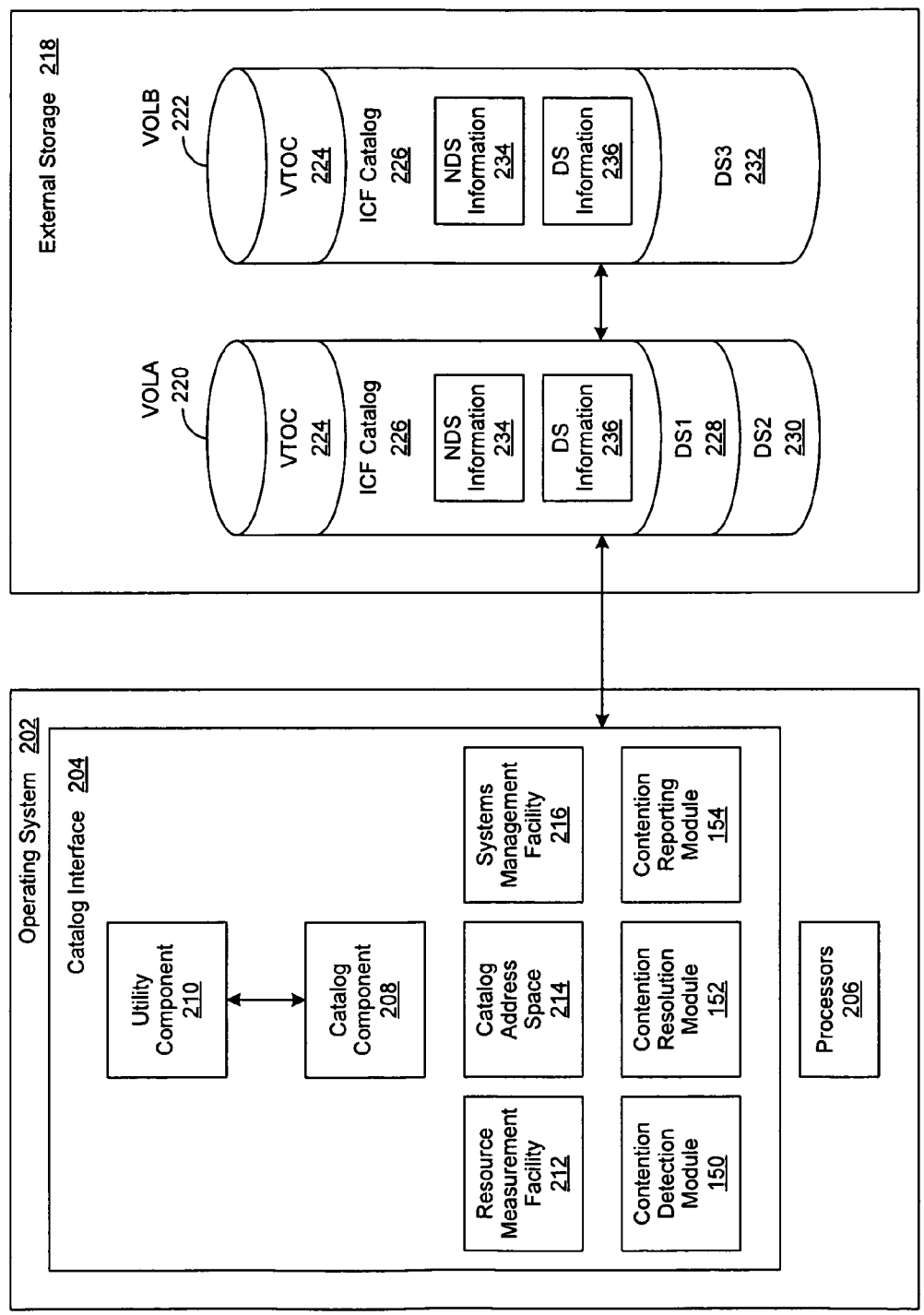
FIG. 2 shows a block diagram of a contention detection module, a contention resolution module, and a contention reporting module for managing an integrated catalog facility (ICF) catalog.

FIG. 2 shows a block diagram of a contention detection module, a contention resolution module, and a contention reporting module for managing an integrated catalog facility (ICF) catalog. In various embodiments, a catalog interface 204 may comprise a utility component 210 and a catalog component 208. Likewise, the catalog interface 204 may comprise a Resource Measurement Facility (RMF) 212, a Catalog Address Space (CAS) 214, and a Systems Management Facility (SMF). The catalog interface 204 may also comprise contention detection module 150, a contention resolution module 152, and a contention reporting module 154. The catalog interface 204 may be contained within a computer operating system 202 and may interface with memory 218 containing one or more the volumes 220, 222. The memory 218 may be in the form of external storage 218. In these and other embodiments, there may be one or more processors 206 driving the computer operating system 202 and executing the catalog interface 204.

The volumes 220, 222 may include an ICF catalog 226, a volume table of contents (VTOC) 224, and a plurality of data sets 228, 230, 232. The ICF catalog 226, as described in greater detail herein, contains non-data-specific information ("NDS Information") 234 and data-specific information ("DS Information") 236. The VTOC 120 may list the data sets that reside on its volume, along with information about the location and size of each data set, and other data set attributes. The catalog interface 204 may execute steps to pass information between catalogs.

In various embodiments, the operation of an ICF catalog 226 is monitored by a contention detection module 150 to detect catalog resource contentions. If a catalog resource contention is detected, then the contention detection module 150 uses information related to the catalog resource contention to generate a contention event. In one embodiment, the catalog resource contention information is received from a Resource Measurement Facility (RMF) 212. In another embodiment, the catalog activity and type of usage information is received from a System Management Facility (SMF) 216. In yet another embodiment, the catalog resource contention information is received from a Catalog Address Space (CAS) 214.

To resolve the catalog resource contention, a contention resolution module 152 first receives information related to the contention event from the contention detection module 150. The information related to the contention event is then used by the contention resolution module 152 to perform a contention resolution operation. Once the resolution operation has been performed, contention events and contention resolution operations are reported by a contention reporting module 154.

Figure 3:
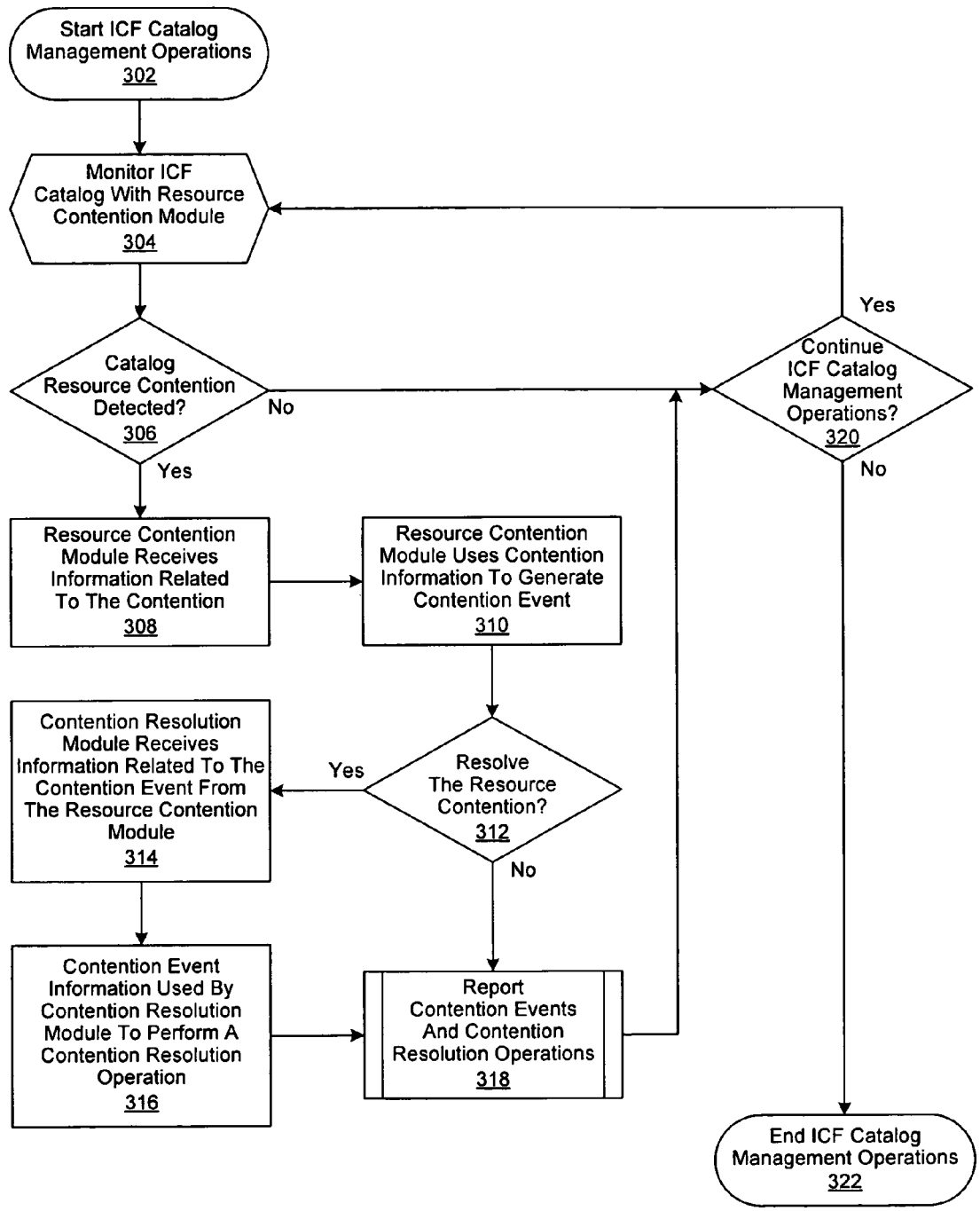
FIG. 3 shows a flow chart of the operation of a contention detection module, a contention resolution module, and a contention reporting module as implemented for managing an ICF catalog.

FIG. 3 shows a flow chart of the operation of a contention detection module, a contention resolution module, and a contention reporting module as implemented for managing an integrated catalog facility (ICF) catalog.

In this embodiment, ICF catalog management operations are begun in step 302, followed by the monitoring the operation of an ICF catalog with a contention detection module in step 304. A determination is then made in step 306 whether the contention detection module has detected a catalog resource contention. If not, then a determination is made in step 320 whether to continue ICF catalog management operations. If not, then ICF catalog management operations are ended in step 322. Otherwise, the process is continued, proceeding with block 304.

However, if it is determined in block 306 that a catalog resource contention has been detected, then the contention detection module receives information related to the catalog resource contention in step 308. In one embodiment, the catalog resource contention information is received from a Resource Measurement Facility (RMF). In another embodiment, the catalog resource contention information received the RMF comprises contention information related to Global Resource Serialization (GRS) major names SYSIGGV2, SYSSZVVDS, or SYSVTOC. Those of skill in the art will be familiar with these GRS major names and understand that contention over these resources is a typical bottleneck for catalog performance and throughput. In another embodiment, the catalog activity and type of usage information is received from a System Management Facility (SMF). In yet another embodiment, the catalog resource contention information is received from a Catalog Address Space (CAS). In one embodiment, resource contention information comprising the number of service tasks available for processing within the CAS is received by the contention detection module. In various embodiments, the received resource contention information comprises information related to a service task's job name, job class, resource needs, resource class, specific resource, or percentage of CAS resources currently held.

Once received, the information related to the catalog resource contention is used by the contention detection module in step 310 to generate a contention event. A determination is then made in step 312 whether to resolve the catalog resource contention. If so, then a contention resolution module receives information related to the contention event from the contention detection module in step 314. The information related to the contention event is then used by the contention resolution module in step 316 to perform a contention resolution operation. In one embodiment, the contention resolution operation comprises limiting the number of service tasks a user can request per job. In another embodiment, the contention resolution operation comprises limiting the number of service tasks a user can request per job class. In yet another embodiment, the contention resolution operation comprises limiting the length of a delay a user can request for use of a predetermined resource.

In one embodiment, the contention resolution operation comprises limiting the length of a delay a user can request for use of a predetermined resource class. In another embodiment, the contention resolution operation comprises canceling a service task in the CAS associated with a user request exceeding a limit on the service task generated by the contention resolution module. In yet another embodiment, the contention resolution operation comprises holding the service task until resources are available in the CAS.

In still another embodiment, the contention resolution operation comprises reordering the priority of a request for resources until the resources are available in the CAS. Skilled practitioners of the art will realize that the ability to reorder resource requests is advantageous as read operations, which can be performed simultaneously, can be prioritized over write operations, which are single-threaded or exclusive. In one embodiment, the contention resolution operation is performed automatically by the contention resolution module. In another embodiment, the contention resolution operation is performed by the contention resolution module in response to user input.

Once the resolution operation has been performed in step 316, or if it was determined in step 312 to not resolve the catalog resource contention, then contention events and contention resolution operations are reported in step 318 by a contention reporting module. In one embodiment, information related to the contention events and contention resolution operations are provided to a user by the contention reporting module. In another embodiment, the contention reporting module uses resource contention and usage information provided by the RMF, SMF, or CAS to automatically reallocate catalog structures. In yet another embodiment, the contention reporting module uses resource contention and usage information provided by the RMF, SMF, or CAS to automatically add additional catalogs. In still another embodiment, the contention reporting module uses resource contention and usage information provided by the RMF, SMF, or CAS to automatically reorganize existing catalog structures. A determination is then made in step 320 whether to continue ICF catalog management operations. If not, then ICF catalog management operations are ended in step 322. Otherwise, the process is continued, proceeding with block 304.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of skill in the art without departing from the scope and spirit of the invention. The embodiment was chosen and described in order to best explain the principles of the invention and the practical application, and to enable others of skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

What is claimed is:

1. A computer-implementable method for managing an integrated catalog facility (ICF) catalog, comprising:
   detecting contention over catalog resources, wherein the detecting is performed by a contention detection module, the contention detection module receiving information related to the contention and using the information related to the contention to generate a contention event;
   resolving the contention over catalog resources, wherein the resolving is performed by a contention resolution module, the contention resolution module receiving information related to the contention event from the contention detection module and using the information related to the contention event to perform a contention resolution operation; and
   reporting the detecting and the resolving of contention over catalog resources, wherein the reporting is performed by a contention reporting module, the contention reporting module reporting information related to the generation of contention events and the generation of contention resolutions; and wherein
   said detecting, resolving and reporting are performed during ICF catalog operations;
   the contention detection module receives the information related to the contention from a Resource Measurement Facility (RMF);
   wherein the catalog detection module is either deployable to a client computer from a server at a remote location or provided by a service provider to a customer on an on-demand basis.

2. The method of claim 1, wherein the contention detection module is further operable to receive the information related to the contention from at least one of:
   a Systems Management Facility (SMF); or
   a Catalog Address Space (CAS).

3. The method of claim 2, wherein the information related to the contention received from the Resource Measurement Facility (RMF) comprises contention information related to a Global Resource Serialization (GRS) managed resource.

4. The method of claim 2, wherein the contention resolution module is further operable to use the information related to the contention event received from the contention detection module to automatically perform contention resolution operations comprising at least one of:
   limit the number of service tasks a user can request per job;
   limit the number of service tasks a user can request per job class;
   limit the length of a delay a user can request for use of a predetermined resource;
   limit the length of a delay a user can request for use of a predetermined resource class;
   cancel a service task in the CAS associated with a user request exceeding a limit on the service task generated by the contention resolution module;
   hold the service task until resources are available in the CAS;
   reorder the priority of a request for resources until the resources are available in the CAS.

5. The method of claim 4, wherein the contention resolution module is operable to receive user input to perform the contention resolution operations.

6. The method of claim 2, wherein the contention reporting module is further operable to receive the information related to the contention provided by the RMF, SMF, or CAS to automatically:
   reallocate catalog alias structures;
   add additional catalogs; or
   reorganize existing catalog structures.

7. A system comprising:
   a processor;
   a data bus coupled to the processor; and
   a computer-usable medium embodying computer program code, the computer-usable medium being coupled to the data bus, the computer program code managing an integrated catalog facility (ICF) catalog and comprising instructions executable by the processor and configured for:
      detecting contention over catalog resources, wherein the detecting is performed by a contention detection module, the contention detection module receiving information related to the contention and using the information related to the contention to generate a contention event;
      resolving the contention over catalog resources, wherein the resolving is performed by a contention resolution module, the contention resolution module receiving information related to the contention event from the contention detection module and using the information related to the contention event to perform a contention resolution operation; and
      reporting the detecting and the resolving of contention over catalog resources, wherein the reporting is performed by a contention reporting module operable to report information related to the generation of contention events and the generation of contention resolutions; and wherein
      said detecting, resolving and reporting are performed during ICF catalog operations;
      the contention detection module receives the information related to the contention from a Resource Measurement Facility (RMF);
      wherein the catalog detection module is either deployable to a client computer from a server at a remote location or provided by a service provider to a customer on an on-demand basis.

8. The system of claim 7, wherein the contention detection module is further operable to receive the information related to the contention from at least one of:
   a Systems Management Facility (SMF); or
   a Catalog Address Space (CAS).

9. The system of claim 8, wherein the information related to the contention received from the Resource Measurement Facility (RMF) comprises contention information related to a Global Resource Serialization (GRS) managed resource.

10. The system of claim 8, wherein the contention resolution module is further operable to use the information related to the contention event received from the contention detection module to automatically perform contention resolution operations comprising at least one of:
   limit the number of service tasks a user can request per job;
   limit the number of service tasks a user can request per job class;
   limit the length of a delay a user can request for use of a predetermined resource;
   limit the length of a delay a user can request for use of a predetermined resource class;
   cancel a service task in the CAS associated with a user request exceeding a limit on the service task generated by the contention resolution module;
   hold the service task until resources are available in the CAS;
   reorder the priority of a request for resources until the resources are available in the CAS.

11. The system of claim 10, wherein the contention resolution module is operable to receive user input to perform the contention resolution operations.

12. The system of claim 8, wherein the contention reporting module is further operable to receive the information related to the contention provided by the RMF, SMF, or CAS to automatically:
   reallocate catalog alias structures;
   add additional catalogs; or
   reorganize existing catalog structures.

13. A non-transitory computer-usable medium embodying computer program code, the computer program code comprising computer executable instructions configured for:
   detecting contention over catalog resources, wherein the detecting is performed by a contention detection module, the contention detection module receiving information related to the contention and using the information related to the contention to generate a contention event;
   resolving the contention over catalog resources, wherein the resolving is performed by a contention resolution module, the contention resolution module receiving information related to the contention event from the contention detection module and using the information related to the contention event to perform a contention resolution operation; and
   reporting the detecting and the resolving of contention over catalog resources, wherein the reporting is performed by a contention reporting module operable to report information related to the generation of contention events and the generation of contention resolutions; and wherein
   said detecting, resolving and reporting are performed during ICF catalog operations;
   the contention detection module receives the information related to the contention from a Resource Measurement Facility (RMF);
   the computer executable instructions either are deployable to a client computer from a server at a remote location or are provided by a service provider to a customer on an on-demand basis.

14. The non-transitory computer usable medium of claim 13, wherein the contention detection module is further operable to receive the information related to the contention from at least one of:
   a Systems Management Facility (SMF); or
   a Catalog Address Space (CAS).

15. The non-transitory computer usable medium of claim 14, wherein the information related to the contention received from the Resource Measurement Facility (RMF) comprises contention information related to a Global Resource Serialization (GRS) managed resource.

16. The non-transitory computer usable medium of claim 13, wherein the contention resolution module is further operable to use the information related to the contention event received from the contention detection module to automatically perform contention resolution operations comprising at least one of:
   limit the number of service tasks a user can request per job;
   limit the number of service tasks a user can request per job class;

limit the length of a delay a user can request for use of a predetermined resource;

limit the length of a delay a user can request for use of a predetermined resource class;

cancel a service task in the CAS associated with a user request exceeding a limit on the service task generated by the contention resolution module;

hold the service task until resources are available in the CAS;

reorder the priority of a request for resources until the resources are available in the CAS.

17. The non-transitory computer usable medium of claim 16, wherein the contention resolution module is operable to receive user input to perform the contention resolution operations.

18. The non-transitory computer usable medium of claim 14, wherein the contention reporting module is further operable to receive the information related to the contention provided by the RMF, SMF, or CAS to automatically:

reallocate catalog alias structures;

add additional catalogs; or reorganize existing catalog structures.

* * * * *